US012793677B1

(12) United States Patent
Altice

(10) Patent No.: US 12,793,677 B1
(45) Date of Patent: Nov. 10, 2026

(54) SOUND BOWL PLAYER

(71) Applicant: Walter Jason Altice, Denver, CO (US)

(72) Inventor: Walter Jason Altice, Denver, CO (US)

( * ) Notice: Subject to any disclaimer, the term of this patent is extended or adjusted under 35 U.S.C. 154(b) by 277 days.

(21) Appl. No.: 18/437,654

(22) Filed: Feb. 9, 2024

Related U.S. Application Data

(60) Provisional application No. 63/467,472, filed on May 18, 2023.

(51) Int. Cl.
*G10F 1/08* (2006.01)
*G10F 5/02* (2006.01)
*G10K 1/062* (2006.01)

(52) U.S. Cl.
CPC .................. *G10F 1/08* (2013.01); *G10F 5/02* (2013.01); *G10K 1/062* (2013.01)

(58) Field of Classification Search
CPC .. G10F 1/08; G10F 5/02; G10D 13/06; G10D 13/12; H05B 47/105; G10K 1/062
See application file for complete search history.

(56) References Cited

U.S. PATENT DOCUMENTS

2019/0380190 A1* 12/2019 Nakamura ............. H04R 1/028
2020/0027434 A1* 1/2020 Becker .................. G10K 1/072

OTHER PUBLICATIONS

Indiegogo "OMMI : Your own personal meditation device"; Nov. 8, 2020; (https://web.archive.org/web/20201108104954/https://www.indiegogo.com/projects/ommi-your-own-personal-meditation-device#/) (Year: 2020).*

* cited by examiner

*Primary Examiner* — Daniell L Negron
(74) *Attorney, Agent, or Firm* — Plager Schack LLP; Mark H. Plager; Stephen Hallberg

(57) ABSTRACT

A sound bowl player may be configured to play a workpiece sound bowl having a rim. An exemplary sound bowl player may include a base platform sized for placement into the workpiece sound bowl, where the base platform includes at least one motor; a rotation platform attached to the base platform, where the rotation platform includes a rotating shaft extending upward therefrom, where the rotating shaft is operatively coupled to and driven by the at least one motor; at least one pivot arm slidably connected to the rotating shaft; a mallet arm pivotable relative to at least one pivot arm; and a mallet connected to the mallet arm, the mallet positionable to contact a rim of the workpiece sound bowl; where the stepper motor causes the mallet to rotate about the rim of the workpiece sound bowl to generate sound.

10 Claims, 5 Drawing Sheets

SOUND BOWL PLAYER

CROSS-REFERENCE TO RELATED APPLICATIONS

This application claims the benefit of priority to U.S. provisional application No. 63/467,472, filed May 18, 2023, which is incorporated by reference herein in its entirety.

FIELD OF THE INVENTION

The invention generally relates to a sound bowl player, and more specifically relates to an autonomous, networkable sound bowl player.

BACKGROUND

Sound bowls (also called singing bowls) are used for meditation to induce relaxation and have been shown to reduce anxiety, stress, and depression. Sound bowls create harmonic vibrational sound frequencies that impact the listener's sympathetic nervous system as their brain wave patterns synchronize to the vibrations from the bowl. Sound bowls are played by manually dragging a mallet around the rim of a sound bowl, making it vibrate to produce a sound. Sound bowls are made in different sizes and with different materials. One person typically plays one or more bowls for a group of people or for themselves. When played for a group, this is usually called a sound bath, which has emotional and spiritual healing properties. It is difficult for one person to play multiple bowls at once, to play for a long time, and/or to synchronize the playing of multiple bowls. To do so, the bowls must be in proximity to the player. Further, a player currently has no way to adjust illumination effects of the bowls while playing a sound bowl. The ability to play and synchronize multiple bowls in a large area, with or without lighting, is not currently possible without multiple players or other complications.

SUMMARY OF THE INVENTION

In an aspect of the invention, an autonomous sound bowl player plays a sound bowl, without the need for human intervention, and can do so for a long period of time. This autonomous play allows personal meditation to be much more effective and relaxing, because the requirement to play the bowl is automated.

In an aspect of the invention, multiple autonomous sound bowl players may be networked together. Group mediations can be greatly enhanced by networking and synchronizing multiple autonomous sound bowl players over a large area, with or without accompanying music. Since this device can network with additional bowl players, the bowls can be spread around the room and people can spread out, rather than crowd together.

In an aspect of the invention, an autonomous sound bowl player may include one or more lights that provide illumination effects on a sound bowl. When multiple autonomous sound bowl players are networked together, the illumination effects of multiple players may be synchronized to create a more relaxing, captivating environment.

In an aspect of the invention, multiple autonomous sound bowl players may be networked together and spaced apart from one another by distances greater than would be possible if a human were to play multiple sound bowls at once. Such distances may span thousands of miles where multiple autonomous sound bowl players are connected by a communications network such as the internet.

BRIEF DESCRIPTION OF THE DRAWINGS

The use of the same reference symbols in different figures indicates similar or identical items.

DETAILED DESCRIPTION

Figure 1:
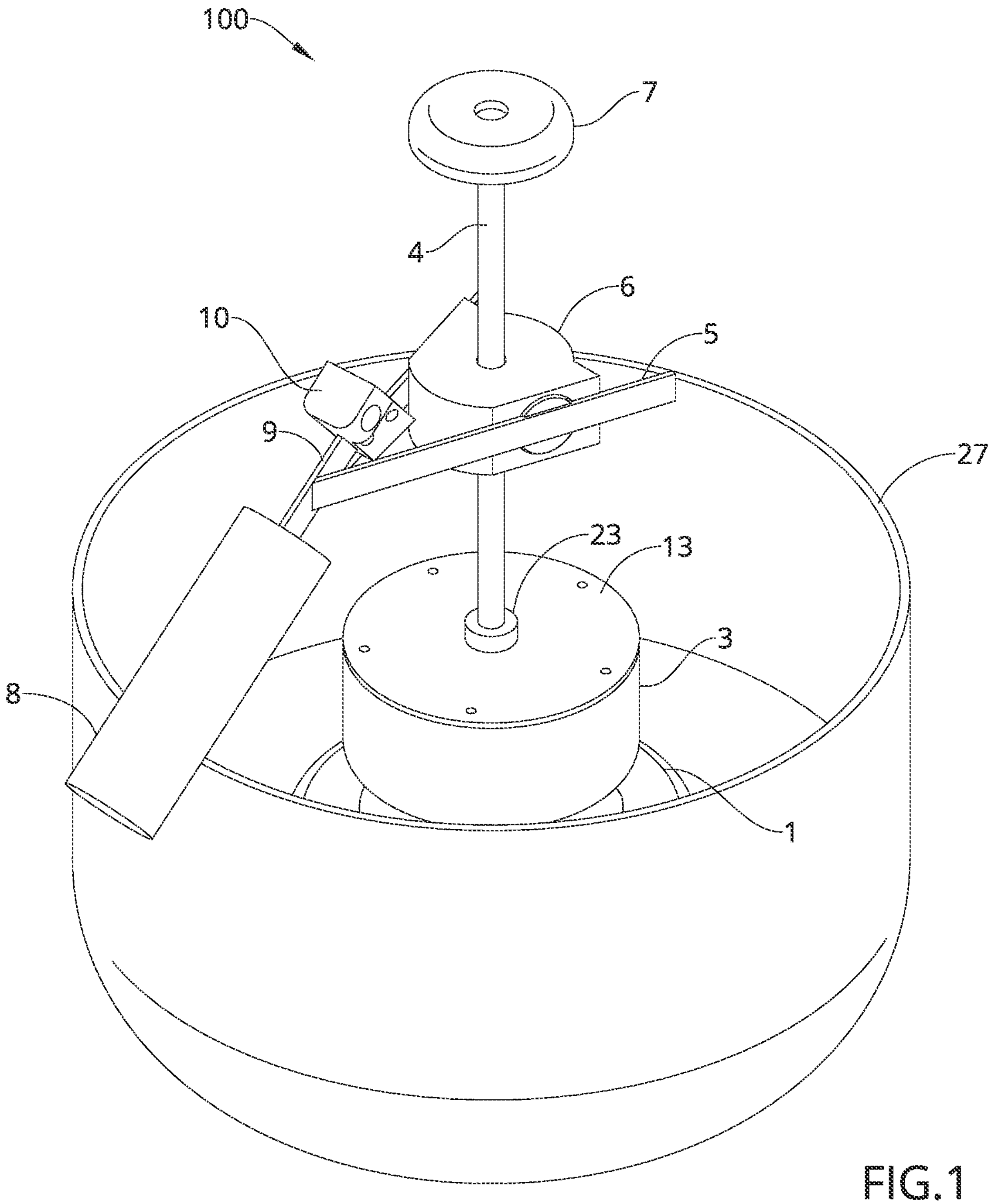
FIG. 1 is a top perspective view of a sound bowl player.
Figure 2:
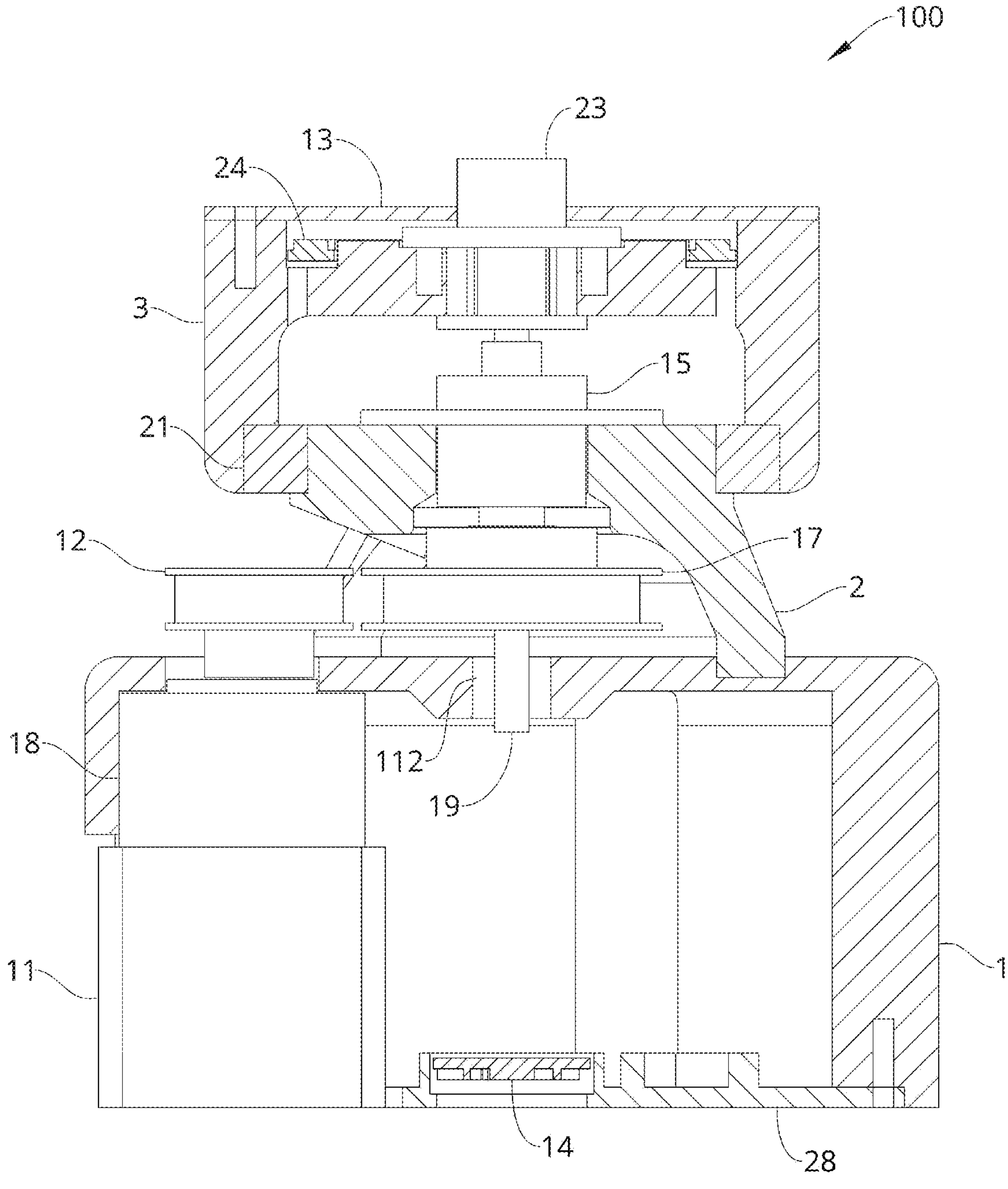
FIG. 2 is a cross-section view of the sound bowl player of FIG. 1.
Figure 3:
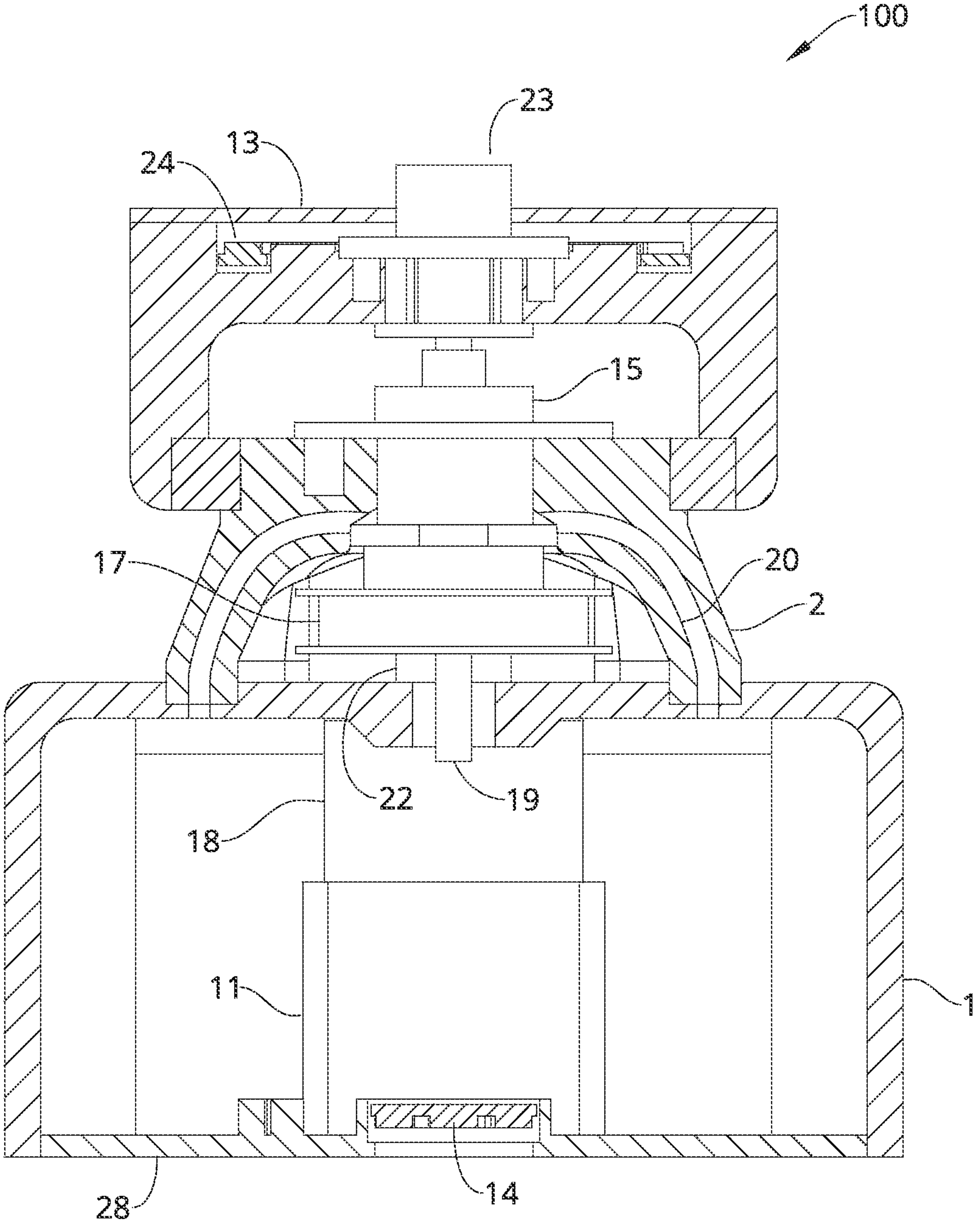
FIG. 3 is a second cross-section view of the sound bowl player of FIG. 1, substantially perpendicular to the cross-section view of FIG. 2.
Figure 4:
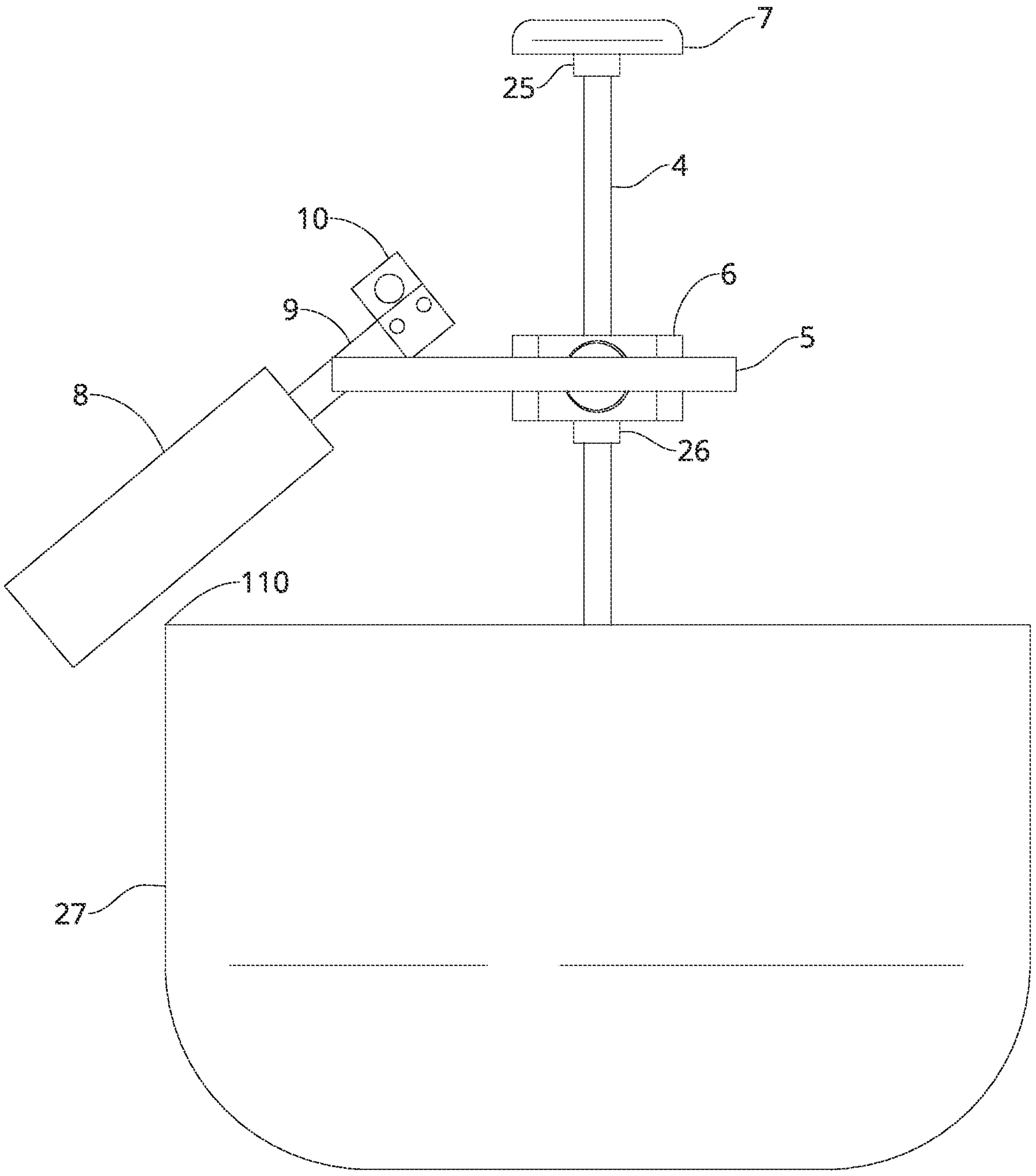
FIG. 4 is a side view of the sound bowl player of FIG. 1 positioned in a workpiece sound bowl.
Figure 5:
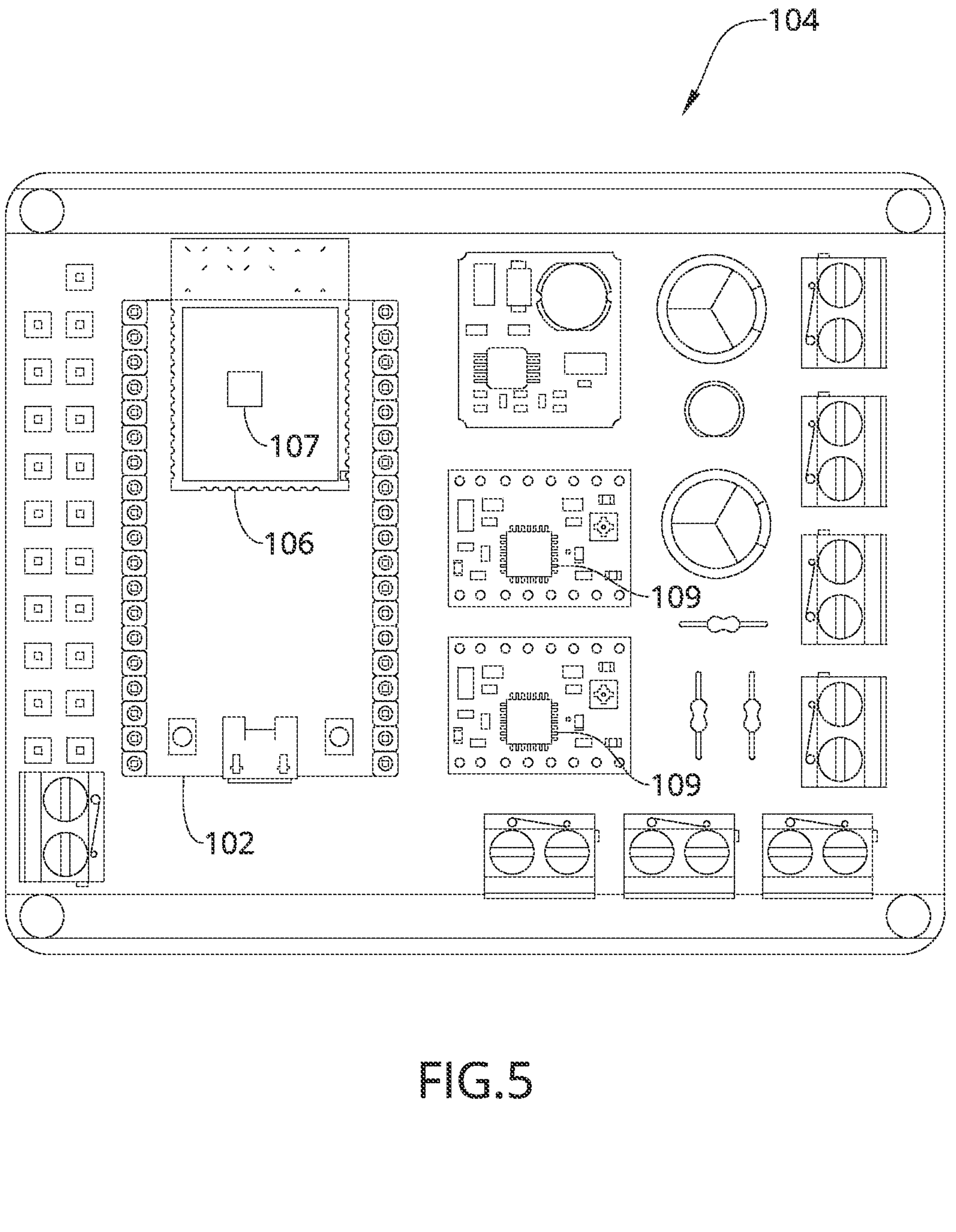
FIG. 5 is a schematic view of a printed circuit board with components attached thereto.

Referring to FIGS. 1-2, a sound bowl player 100 is placed into a sound bowl 27. The sound bowl player 100 is sized to fit within standard sound bowls 27. By placing the sound bowl player 100 into a sound bowl 27, the size of the sound bowl player 100 may be minimized, thereby simplifying its use.

The sound bowl player 100 may include a base platform 1. The base platform 1 may be weighted to prevent substantially motion of the base platform 1 relative to the sound bowl 27 in use. A cover 28 may be provided at the bottom of the base platform 1. The cover 28 may include vibration damping material on all or part of its bottom surface in order to dampen vibration transfer to and/or from the sound bowl 27. According to some embodiments, at least one bottom light 14 may be positioned at the bottom of the base platform 1; if so, the cover 28 does not extend over the at least one bottom light 14. The at least one bottom light 14 may be any suitable lighting component. For example, at least one bottom light 14 may be a light-emitting diode (LED). The bottom light 14 may be utilized to illuminate the bottom surface of the sound bowl 27. The inner surface of the sound bowl 27 may be translucent, both reflecting light from the at least one bottom light 14 out of the sound bowl 27 and transmitting light through the sound bowl 27, thereby creating light that is viewable by the user and/or observers.

At least one motor 11 may be positioned within the base platform 1. The motor 11 may be any suitable motor. As one example, at least one motor 11 may be a stepper motor. More than one motor 11 may be advantageous for use with a heavy and/or long mallet, as described below. A printed circuit board (PCB) 104 or similar structure may be located in the base platform 1 or in any other suitable part of the sound bowl player 100. The PCB 104 and/or the components mounted thereto are operatively connected to the components of the sound bowl player 100 that are controlled thereby. The PCB 104 may include a memory 102 and a microcontroller 106. The microcontroller 106 is electrically connected to, and controls actuation of, each motor 11. The microcontroller 106 may control each motor 11 directly, or via a separate motor controller or controllers 109. The motor controller or controllers 109 may be mounted on the PCB 104 in electrical communication with the microcontroller 106. The microcontroller 106 also may be connected to the at least one bottom light 14, and may be configured to turn at least one bottom light 14 on and off, and/or to control the emission characteristics of the light emitted from the at least one bottom light 14. Such emission characteristics may include luminosity, color, duration and timing of illumination. Power to the PCB 104, the microcontroller 106, the at least one light 14,24, and other components of the sound bowl player 100 that require electrical power may be provided by at least one battery which may be mounted on the PCB 104 or electrically connected to the PCB 104. The at least one battery may be located in the base platform 1 or in another part of the sound bowl player 100. The sound bowl player 100 may be configured to receive external power in addition to, or instead of, utilizing power from the at least one battery. According to some embodiments, a networking module 107 is attached to the PCB 104 and is in electronic communication with the microcontroller 106. The networking module 107 is configured to network to and communicate with the networking module 107 of one or more other sound bowl players 100 nearby. The networking module 107 may connect to one or more other sound bowl players 100 directly, or may connect to one or more other sound bowl players 100 through an app on a user's smartphone, laptop or other computer, or through a separate standalone device configured to connect multiple sound bowl players 100 nearby. As another example, the networking module 107 may be configured to connect to a computer network such as the internet, whether directly, through an app on the user's smartphone, laptop or other computer, or through a separate standalone device. By connecting the sound bowl player 100 to a computer network such as the internet, sound bowl players 100 around the world, or even in orbit, may be interlinked and their play may be synchronized. By way of example and not limitation, the networking module 107 may be configured to transmit and receive data utilizing any suitable protocol, such as the WI-FI® protocol of the Wi-Fi Alliance of Austin, Texas; the BLUETOOTH® protocol of the Bluetooth SIG of Kirkland, Washington; and/or the LoRaWAN® protocol of the LoRa Alliance of Fremont, California.

The base platform 1 advantageously limits its points of contact with the motor 11 and the stepper motor gears 18 to increase torque. A center shaft 19 passes upward out of the base platform 1 through an aperture 112. Optionally, the center shaft 19 may pass through a bearing and/or lock collar at the aperture 112 to center and hold the center shaft 19 laterally in place.

The center shaft 19 extends upward into a rotation platform 2. The rotation platform 2 may be fixed to the base platform 1. A stepper motor pulley 12 may be located in the rotation platform 2, and that stepper motor pulley 12 is coupled to a corresponding motor 11, such that the motor 11 controls the rotation of the stepper motor pulley 12. A center shaft pulley 17 may be located in the rotation platform 2, and that center shaft pulley 17 is coupled to the center shaft 19. The stepper motor pulley 12 is coupled to the center shaft pulley 17 in order to cause rotation of the center shaft pulley 17 based on the motion of the stepper motor pulley 12. According to some embodiments, a belt may extend around part of both the stepper motor pulley 12 and the center shaft pulley 17, so that rotation of the stepper motor pulley 12 moves the belt in one direction, and that motion of the belt causes the center shaft pulley 17 to rotate in that same direction. According to other embodiments, the stepper motor pulley 12 and the center shaft pulley 17 are direct gears or magnetic gears that directly engage one other, or that engage one another through one or more intermediate gears, allowing the belt to be omitted. In such embodiments, rotation of the stepper motor pulley 12 in one direction may cause the center shaft pulley 17 to rotate in an opposite direction. The center shaft 19 rotates based on the driving input received at the center shaft pulley 17 from the stepper motor pulley 12. The rotation platform 2 covers and protects the stepper motor pulley 12, center shaft pulley 17, and the belt (if used) connecting the stepper motor pulley 12 to the center shaft pulley 17.

A rotation top 3 is positioned atop the rotation platform 2. A bearing 21 is positioned between the rotation top 3 and the rotation platform 2, allowing the rotation top 3 to rotate smoothly relative to the rotation platform 2. The center shaft 19 extends upward from the center shaft pulley 17 into the rotation top 3. A wire channel 20 may extend through the rotation platform 2 to pass one or more wires into the base platform 1, which may carry power and/or control signals. A slip ring 15 may be fixed to the center shaft 19 inside the rotation top 3, which allows for transmission of power and data from the wires that extend through the wire channel 20 to components above the rotation platform 2. The center shaft 19 continues upward to engage the top center shaft coupling 16, which is fixed to the center shaft 19. In this way, the rotation top 3 rotates relative to the rotation platform 2 and base platform 1 by being driven to rotate by the center shaft 19. A rotating shaft coupling 23 may be positioned at the top of the rotation top 3. The rotation shaft coupling 23 may be rotationally fixed relative to the center shaft 19.

According to some embodiments, at least one top light 24 is located in the rotation top 3. The at least one top light 24 may be a light-emitting diode (LED), laser diode, or any other suitable light. The at least one top light 24 may be the same kind of lights as the at least one bottom light 14, or may be a different kind of light. A top lens 13 may form all or part of an upper surface of the rotation top 3. The top lens 13 allows light from the at least one top light 24 to be transmitted upward out of the rotation top, and optionally may provide a lighting effect, such as diffusion, diffraction, patterning, or any other suitable effect. The top lens 13 may be interchangeable so that different lighting effects may be selected by a user by changing the top lens. According to other embodiments, the top lens 13 may be omitted, and an opaque cover may be provided in its place. In such embodiments, the at least one top light 24 may be positioned on the opaque cover, or the at least one top light 24 may be omitted.

Referring also to FIG. 1, a rotation shaft 4 is attached to the rotating shaft coupling 23 of the rotation top 3. That rotation shaft 4 rotates with the rotation top 3. The rotation shaft 4 may be simply the upper end of the center shaft 19, or may be a separate component. A pivot base 6 is adjustably connected to the rotation shaft 4 via a pivot base coupling 26. The pivot base coupling 26 allows a user to move the pivot base 6 up and down along the rotation shaft 4, in order to accommodate sound bowls 27 of differing heights.

At least one pivot arm 5 extends radially outward from the pivot base 6. According to some embodiments, the at least one pivot arm 5 is configured to pivot at its connection with the pivot base 6. In this way, the at least one pivot arm 5 is adjustable to accommodate sound bowls 17 of differing heights. In such embodiments, the pivot base 6 may be fixed to the rotation shaft 4. According to some embodiments, the at least one pivot arm 5 is fixed to the pivot base 6, and the pivot base 6 is not fixed to the rotation shaft 4. A mallet arm 9 is connected to at least one pivot arm 5. A mallet 8 is connected to the mallet arm 9, permanently or detachably. A detachable connection may be performed with quick disconnects, magnets, threaded connectors, or any other suitable connection. The mallet 8 contacts the sound bowl 27 to make sound. The mallet arm 9 includes a mallet arm lever 10 at an end of the mallet arm 9 opposite the mallet 8. A mallet arm lever actuator 118 is operably connected to the mallet arm lever 10. According to some embodiments, the mallet arm actuator 118 is positioned at the end of the mallet arm 9 opposite the mallet 8. A bar, rod or other structure may extend from the mallet arm actuator 118 to the rotating shaft 4, to one or more pivot arms 5, and/or to a component of the rotation top 3 that is rotationally fixed relative to the mallet arm actuator 118. The mallet arm actuator 118 is an actuator such as a linear actuator or a servomechanism that applies an upward or downward force to the mallet arm lever 10. Where the mallet arm actuator 118 is positioned at the end of the mallet arm 9, the bar, rod or other structure that extends to the rotating shaft 4 or other structure provides something fixed that the mallet arm actuator 118 can push or pull against. In this way, the pressure the mallet 8 exerts on the sound bowl may be adjusted upward or downward. In other embodiments, the mallet arm actuator 118 is positioned on the rotating shaft 4, one or more pivot arms 5, and/or a component of the rotation top 3 that is rotationally fixed relative to the mallet arm actuator 118. As in the embodiments described immediately previously, a bar, rod or other structure may extend from the mallet arm actuator 118 to the mallet arm lever 10. The mallet arm actuator 118 thus may be actuated to move the bar, rod or other structure connected thereto in order to apply a force to the mallet arm lever 10, so that the pressure the mallet 8 exerts on the sound bowl may be adjusted upward or downward.

A rotating shaft top 7 may be connected to the top end, or to a location near the top end, of the rotating shaft 4. The rotating shaft top 7 acts as a handle to allow the user to lower the sound bowl player 100 into a sound bowl 27 easily. Optionally, ornamentation and/or additional lights may be placed on the rotating shaft top 7.

Operation

To operate the sound bowl player 100, a user first places the sound bowl player into a sound bowl 27 to be played. The user may utilize the rotating shaft top 7 for convenience, lifting up the sound bowl player 100 by the rotating shaft top 7 and lowering the sound bowl player 100 into place while still holding the rotating shaft top. Once the sound bowl player 100 is resting in the sound bowl 27, the user releases the rotating shaft top 7. Where one or more vibration damping feet 102 are located on the bottom surface of the base platform 1 of the sound bowl player 100, the sound bowl player 100 rests on the inside of the sound bowl 27, on the bottom surface of the sound bowl 27, on the one or more vibration damping feet.

Next, the user may adjust the height of the mallet 8 to match the size of the sound bowl 27 in which the sound bowl player 100 has been placed. Advantageously, the mallet 8 is moved up or down the rotation shaft 4, using the pivot base coupling 26, so that the mallet 8 rests on the rim 110 of the sound bowl 27 and not on the outer surface of the sound bowl 27. By placing the mallet 8 in contact with the rim 110 of the sound bowl 27, rather than the outer surface of the sound bowl 27, better sound quality is obtained.

Next, the user may turn on the sound bowl player 100. The user may do so by actuating a switch or other control on the sound bowl player 100, which is electrically connected to the microcontroller 106. Alternately, the user may turn on the sound bowl player 100 before placing it in the sound bowl 27, such as where the switch is located on the base platform 1.

Next, the user may provide input to the sound bowl player 100 to control one or more aspects of its operation. As one example, the user may provide external input to the sound bowl player 100 via the networking module 107. The user may do so by utilizing an app on their mobile phone, tablet or other device, by utilizing software installed on a computer, or by utilizing other hardware or software to transmit external input. As another example, the user may provide input via a touchscreen or other component of the sound bowl player 100.

Next, the pressure of the mallet 8 on the rim 110 of the sound bowl 27 may be adjusted. In some embodiments, external input may be received from the user via the networking module 107 to adjust the pressure on the mallet 8. In other embodiments, the user may utilize a component of the sound bowl player 100, such as a touchscreen, to adjust the pressure on the mallet 8. In either case, the mallet 8 remains in contact with the rim 110 of the sound bowl 27. Alternately, the mallet arm actuator 118 may include at least one manual control that may be actuated directly by the user to increase or decrease the pressure exerted by the mallet 8 against the rim 110 of the sound bowl 27.

The user then may actuate the sound bowl player 100 to begin playing. The user may provide external input that is received by the networking module 107 to provide that actuation. According to other embodiments, the user may utilize a component of the sound bowl player 100 such as a touchscreen to cause it to begin playing. The sound bowl player 100 actuates each motor 11, which causes each corresponding stepper motor pulley 12 to rotate, which in turn causes the center shaft pulley 17 and center shaft 19 to rotate. That rotation is transmitted to the rotation shaft 4, which causes the rotation top 3 to rotate. The rotation of the rotation shaft 4 causes the pivot arm or arms 5 to rotate, which in turn causes the mallet arm 9 and the mallet 8 to rotate about the rotation shaft 4. The mallet 8 is in contact with the rim 110 of the sound bowl 27, and as a result the rotation of the mallet 8 against the rim 110 of the sound bowl 27 causes the sound bowl 27 to emit a pleasing tone. That particular tone is related to the rotation speed of the mallet 8. By controlling the rotation speed of the rotation shaft 4, the tone produced by the sound bowl 27 may be changed. The use of one or more stepper motors 11 allows for fine control of rotation speed of the rotation shaft 4, thereby allowing for fine control of the musical notes produced by rotation of the mallet 8 against the rim 110 of the sound bowl 27. Advantageously, the mallet 8 contacts only the rim 110 of the sound bowl 27 while playing it; it does not substantially contact the outer surface of the sound bowl 27. While the sound bowl player 100 plays, the base platform 1 does not rotate; it remains stationary while the rotation shaft 4 and mallet 8 rotate relative to it and the sound bowl 27. Further, the sound bowl 27 does not rotate while being played. Both the base platform 1 and the sound bowl 27 remain stationary, and do not move or rotate relative to one another.

As the sound bowl player 100 begins playing, or before or after that playing starts, the sound bowl player 100 may begin to emit light from the at least one bottom light 14 and/or at least one top light 24. The emission characteristics of that light over time may be stored in memory 102, and the microcontroller 106 uses those stored characteristics to control the at least one bottom light 14 and/or at least one top light 24 to emit light with such emission characteristics. In other embodiments, external input may be received from the user via the networking module 107 to control, in whole or in part, the emission characteristics of the light emitted from the at least one bottom light 14 and/or at least one top light 24.

The sound bowl player 100 lifts the mallet 8 out of contact with the rim 110 of the sound bowl 27, using the mallet arm lever actuator 118, at various times in the course of playing the sound bowl 27 in order to enhance the overall quality of the sound, because the sound bowl 27 typically cannot be played indefinitely. The sound bowl player 100 may lift the mallet 8 out of contact with the rim 110 of the sound bowl 27 automatically and/or intermittently. As used in this document, the term "intermittently" may refer to periodic, predetermined, semi-random, or random times during a performance. In some embodiments, lifting the mallet 8 out of contact with the rim 110 of the sound bowl 27 may be performed based on data stored in association with the microcontroller 106, which controls the timing of that lifting. In some embodiments, one or more sensors are included in the sound bowl player 100, such as a vibration sensor and/or a microphone, and lifting the mallet 8 out of contact with the rim 110 of the sound bowl 27 may be performed based on input received from those one or more sensors. Alternately, or in addition, the user may control partially or entirely when the sound bowl player 100 lifts the mallet 8 out of contact with the rim 110 of the sound bowl 27. The user may control that lifting of the mallet 8 by providing external input received from the user via the networking module 107, or may utilize a component of the sound bowl player 100 such as a touchscreen to provide input to control that lifting.

The user may adjust one or more parameters of operation of the sound bowl player 100 prior to and/or during its operation. Such parameters may include emission characteristics of the bottom light 14 and/or the top light 24; one or more characteristics of the sound; and/or other controllable parameters. External input may be received from the user via the networking module 107 to adjust one or more such parameters, or may utilize a component of the sound bowl player 100 such as a touchscreen to adjust those one or more parameters.

Optionally, the user may utilize more than one sound bowl player 100 during a performance. If so, the sound bowl players 100 may be networked together via their networking modules 107. The sound bowl players 100 may be configured to discover one another and link together via their networking modules 107 automatically, without user intervention. Alternately, the user may manually connect and/or disconnect different sound bowl players 100 to create or modify a network thereof.

The user may synchronize light and/or sounds among the networked sound bowl players 100. Synchronizing light refers to coordination of the emission characteristics of the bottom light 14, the top light 24, and/or other light or lights associated with the sound bowl player 100 among networked sound bowl players 100 to create a desired collective effect. Synchronizing sound refers to coordination of sound produced among networked sound bowl players 100 to create a desired collective effect, such as by creating harmony among the sounds generated by different sound bowl players 100. The user may control that synchronization, such as by providing external input received from the user via the networking module 107 to control that synchronization, or by providing input through a component of the sound bowl player 100 such as a touchscreen. As another example, the sound bowl players 100 may include predetermined synchronization stored therein in memory on the PCB 104, such that the sound created by contact of the mallet 8 and the sound bowl 27, and/or emission characteristics of the light emitted from the bottom lights 14 and/or the top lights 24, of the sound bowl players 100 are synchronized without intervention from the user.

The order of the operations above may be rearranged by the user, as will be appreciated by one skilled in the art. Additionally, one or more of the operations above may be omitted by the user, according to the user's preference.

Optionally, one or more sensors may be included in the sound bowl player 100, each connected to the microcontroller 106. One such sensor may be a tip sensor, which is an accelerometer or other sensor that measures the tilt angle and/or rate of tilt change of the sound bowl player 100. The microcontroller 106 may turn off the sound bowl player 100 and/or issue an alarm if the sound bowl player 100 begins to tip over, such that damage to the sound bowl player 100 and/or sound bowl 27 may be prevented or minimized. Another such sensor may be at least one distance sensor, which senses the distance between the base platform 1 and the inner surface of the sound bowl 27. The microcontroller 106 may utilize that information to direct the user to move the base platform 1 in a particular direction to ensure that the base platform 1 is substantially centered in the sound bowl 27. Another such sensor may be a pressure sensor that measures the force exerted by the mallet 8 on the rim 110 of the sound bowl 27. The microcontroller 106 may utilize that pressure data to control the pressure exerted by the mallet 8 against the rim 110 of the sound bowl 27 more precisely.

Where a plurality of networked sound bowl players 100 are played at once by a user, the networked sound bowls may be spaced apart from one another by a networked distance, which is longer than the distance between sound bowls that could be played by a single human. This allows the user to create a sound bath in a large room and accommodate more listeners than would be possible if a single human attempted to play multiple sound bowls at once. As used in this document, the phrase "networked distance" means at least thirty feet. A plurality of networked sound bowl players 100 may be separated from one another by as much as thousands of miles, where those networked sound bowl players 100 are connected by a large-scale computer network such as the internet.

As used in this document, and as customarily used in the art, terms of approximation, including the words "substantially" and "about," are defined to mean normal variations in the dimensions and other properties of finished goods that result from manufacturing tolerances and other manufacturing imprecisions, and the normal variations in the measurement of such dimensions and other properties of finished goods. While the invention has been described in detail, it will be apparent to one skilled in the art that various changes and modifications can be made and equivalents employed, without departing from the present invention.

What is claimed is:

1. A sound bowl player configured to play a workpiece sound bowl having an interior bottom surface and a rim, comprising:

a base platform configured to be received inside the workpiece sound bowl and to rest on the interior bottom surface of the workpiece sound bowl in a stationary position, said base platform comprising at least one motor;

a rotation platform mounted above and fixed relative to said base platform;

a rotating shaft extending upward from said rotation platform and operatively coupled to and driven by said at least one motor;

at least one pivot arm slidably connected to said rotating shaft;

a mallet arm pivotably connected to said at least one said pivot arm; and a mallet connected to said mallet arm and positioned to contact the rim of the workpiece sound bowl;

wherein said rotating shaft rotates relative to said stationary base platform and causes said mallet to move circumferentially along the rim of the workpiece sound bowl to generate sound.

2. The sound bowl player of claim 1, further comprising:
a rotating shaft top attached to said rotating shaft; and
at least one light attached to at least one of said rotating shaft top and said base platform.

3. The sound bowl player of claim 1, further comprising a networking module positioned in said base platform, said networking module configured to receive external input and to communicably connect to at least one additional networking module of a corresponding sound bowl player or networkable component.

4. The sound bowl player of claim 1, wherein said mallet is detachable from said mallet arm.

5. A method of playing at least one workpiece sound bowl having an interior bottom surface and a rim, comprising:
providing a sound bowl player comprising a base platform positioned inside the workpiece sound bowl and resting on the interior bottom surface of the workpiece sound bowl in a stationary position, at least one motor mounted in the base platform, a rotation platform fixed relative to said base platform, a rotating shaft extending upward from the rotation platform and driven by the motor, at least one pivot arm slidably connected to said rotating shaft, a mallet arm pivotably connected to the pivot arm, and a mallet connected to said mallet arm and positioned to contact a rim of the workpiece sound bowl;
contacting the rim of the workpiece sound bowl with said mallet;
rotating the rotating shaft relative to the stationary base platform to move the mallet circumferentially along the rim of the workpiece sound bowl to generate sound; and
lifting the mallet off of the rim of the workpiece sound bowl intermittently.

6. The method of claim 5, further comprising providing at least one more said sound bowl player, and networking said sound bowl players to synchronize sound generated by said sound bowl players.

7. The method of claim 6, wherein said sound bowl players are communicably connected when physically spaced apart.

8. The method of claim 6, further comprising:
providing at least one light on each said sound bowl player; and
controlling and synchronizing emission characteristics of at least one said light of the sound bowl players during said playing.

9. The method of claim 6, wherein said networking is performed automatically.

10. A method of playing a plurality of sound bowls simultaneously, comprising:
providing a plurality of sound bowl players each comprising a base platform positioned inside a corresponding sound bowl and resting on an interior bottom surface of the corresponding sound bowl in a stationary position, at least one motor mounted in the base platform, a rotation platform fixed relative to the base platform, a rotating shaft extending upward from the rotation platform and driven by the motor, at least one pivot arm slidably connected to said rotating shaft, a mallet arm pivotably connected to the pivot arm, a mallet connected to said mallet arm and positioned to contact a rim of the corresponding sound bowl, and at least one light on each said sound bowl player;
contacting the rim of each corresponding sound bowl with the corresponding mallet;
rotating each rotating shaft relative to its stationary base platform to move the mallet circumferentially along the rim of the corresponding sound bowl to generate sound;
networking said sound bowl players together; and
synchronizing at least one of sound and light generated by said sound bowl players.

* * * * *